Aug. 17, 1948.   D. G. GRISWOLD   2,447,408
POWER OPERATED CHECK VALVE
Filed May 29, 1943   2 Sheets—Sheet 1
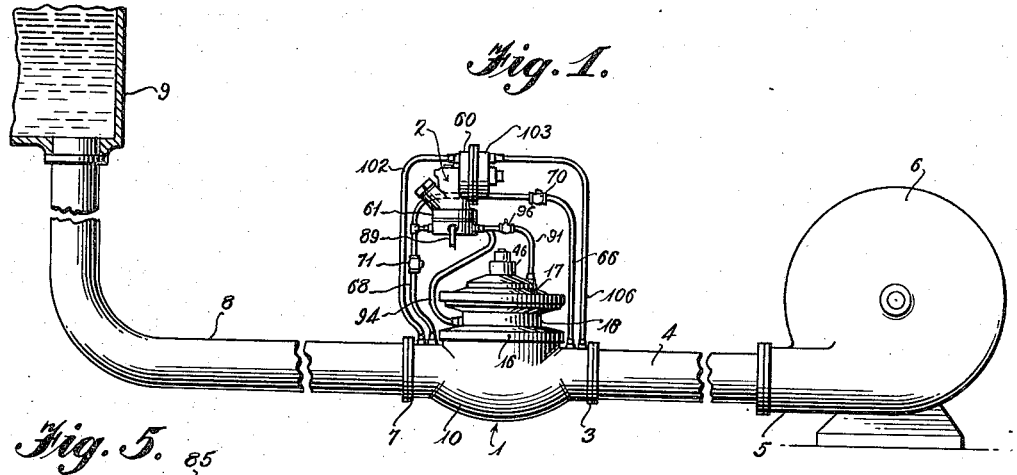
Fig. 1.
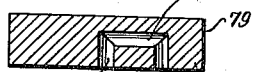
Fig. 5.
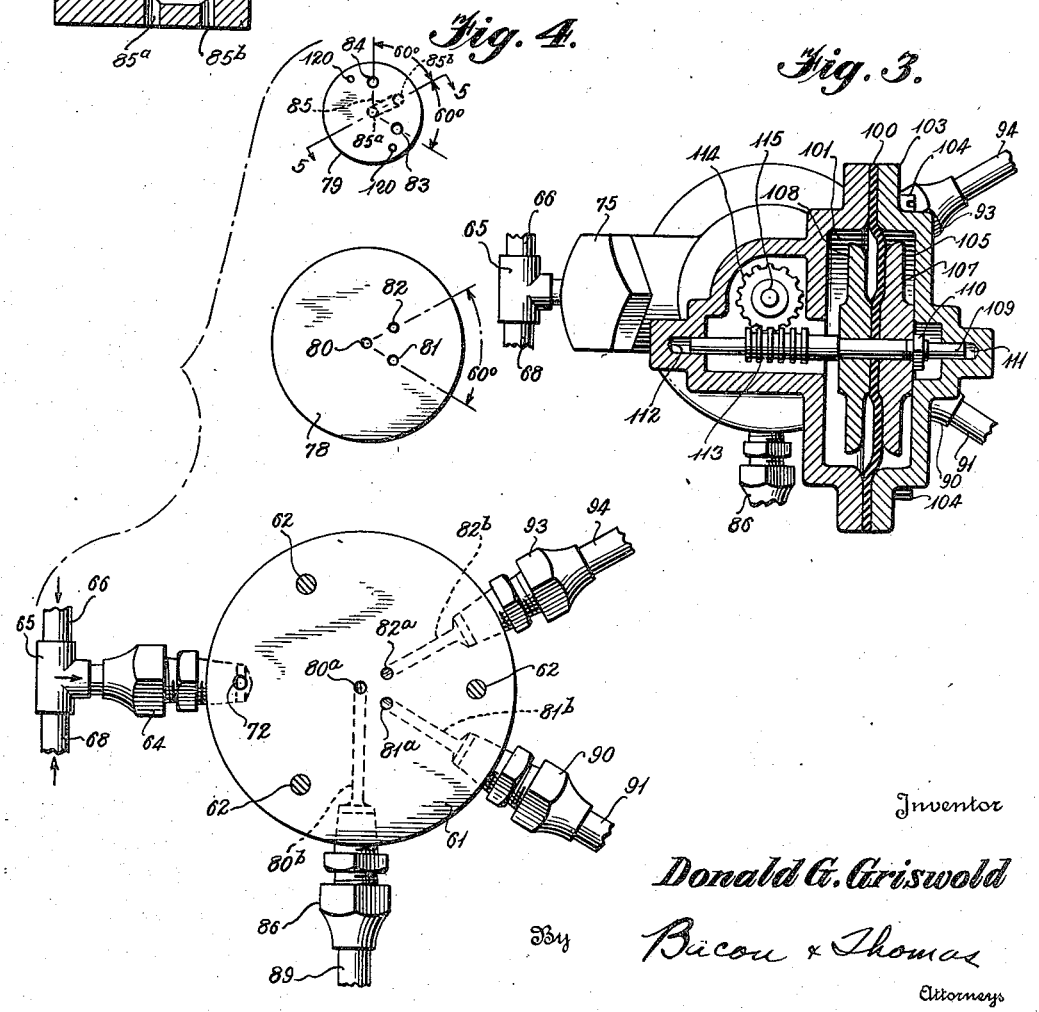
Fig. 4.
Fig. 3.
Inventor
Donald G. Griswold
By Bacon & Thomas
Attorneys

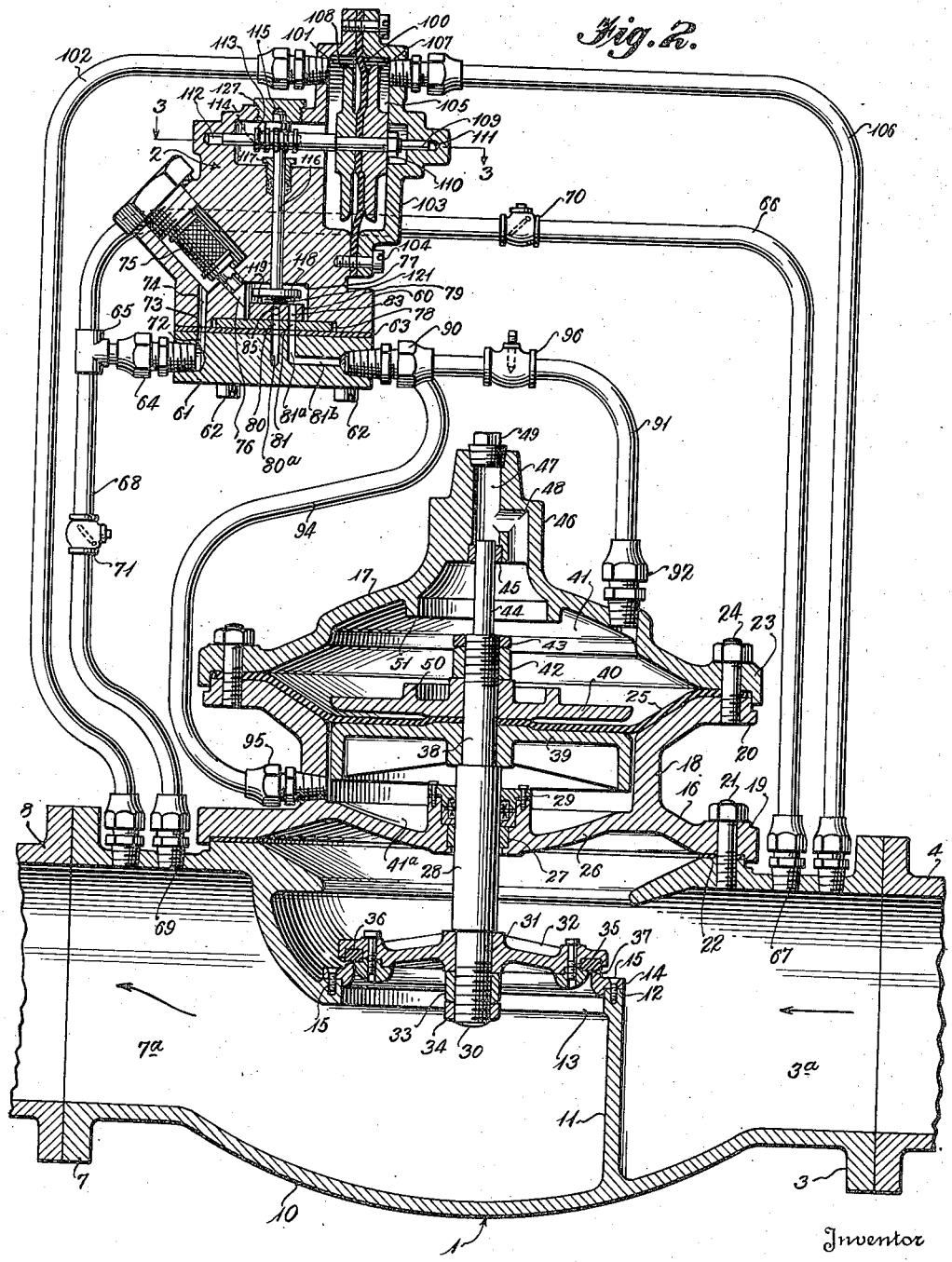

Patented Aug. 17, 1948

2,447,408

UNITED STATES PATENT OFFICE 2,447,408

POWER-OPERATED CHECK VALVE

Donald G. Griswold, Alhambra, Calif., assignor to Clayton Manufacturing Company, Alhambra, Calif.

Application May 29, 1943, Serial No. 489,007

2 Claims. (Cl. 137—153)

The present invention relates to check valves and more particularly to an automatic check valve adapted to be used in a water supply line connected with a pump.

More specifically, the invention relates to a highly sensitive, automatic check valve which will close completely in response to the pressure on the outlet side of said valve when the pump is shut down and which will not open until after the pump has built up a pressure on the inlet side of said valve which is greater than that in the line on the outlet side of said valve.

Another object of the invention is to provide a check valve of large capacity which is power-operated to effect both the positive full opening and full closing of the valve in accordance with pressure changes in the line on the inlet and outlet sides of said valve.

Another object of the invention is to provide an automatic, power-operated check valve that will close at a predetermined rate, regardless of the difference in pressure on the inlet and outlet sides of said valve, and thereby avoid too sudden closing of the valve with resultant line shock.

Another object of the invention is to provide a pilot-controlled, power-operated check valve which is highly sensitive in its operation and yet is normally held in its full open position, in order to prevent restriction or resistance to the flow of liquid through the body of the valve, or held fully closed in drip-tight relation.

Another object of the invention is to provide an automatic, hydraulically operated check valve which derives its operating fluid from either the inlet side or the outlet side of the valve, depending upon which side is subjected to the highest pressure.

A further object of the invention is to provide, in a water pumping system, a flow control valve having a pilot valve associated therewith which is operable in accordance with the pressure differential on the inlet and outlet sides of said flow control valve, and wherein operating fluid for effecting power operation of the main valve can be taken by said pilot valve from either the inlet or outside side of said flow control valve, depending upon which side is subjected to the higher pressure.

A still further object of the invention is to provide a pressure-responsive control means for a hydraulically operated main valve in which the control is operable in accordance with the differential pressure on the inlet and outlet sides of said main valve to effect positive full opening or full closing of said main valve in accordance with variations in the differential pressure.

Other and further objects of the invention will be apparent from the following description taken in conjunction with the accompanying drawings, in which:

Fig. 1 schematically illustrates a water supply system including a pump, and an automatic check valve and pilot control means constructed in accordance with the principles of the present invention (the parts not being drawn to the same relative scale);

Fig. 2 is a diagrammatic, longitudinal sectional view taken through the check valve and the pilot valve of Fig. 1;

Fig. 3 is a horizontal sectional view through the pilot valve taken on the line 3—3 of Fig. 2;

Fig. 4 is a scattered view of the pilot disc, pilot disc seat and fluid distribution base of the pilot valve, particularly showing the relative positions of the ports in these parts; and Fig. 5 is an enlarged sectional view through the pilot disc taken on the line 5—5 of Fig. 4.

Referring now to Figure 1 of the drawings, the numeral 1 generally indicates the hydraulically operated main or check valve and the numeral 2 generally indicates the pressure responsive pilot valve for controlling said main valve. The check valve 1 is connected at its inlet end 3 to one end of a pipeline 4 and the opposite end of said pipeline is connected with the discharge outlet 5 of a conventional centrifugal pump 6. The outlet side 7 of the check valve 1 is connected to one end of a pipeline 8, the opposite end of which is connected with a water storage tank 9 or other source of demand. It will be apparent from the foregoing, that the inlet side 3 of the check valve 1 is subject to the pressure of the fluid in the pump line 4, whereas the outlet side 7 of the check valve is subject to the pressure of the fluid in the pipeline 8 which varies in accordance with the demand.

The check valve 1 comprises a body 10 which terminates at its opposite ends in the previously mentioned inlet and outlet ends 3 and 7, respectively. The body 10 is provided with an internal partition wall 11 which divides the body into inlet and outlet openings 3ª and 7ª, respectively. The partition 11 is provided with a flange 12 surrounding a circular opening 13 which establishes communication between the inlet opening 3ª and the outlet opening 7ª. An annular seat 14 rests upon the face of the flange 12 and is secured thereto by screws 15.

The check valve 1 also comprises an intermediate section 16 and a cover 17. The intermediate section 16 includes a central hollow cylindrical portion 18 and radially extending end flanges 19 and 20. The flange 19 is secured to the body 10 by a suitable number of studs 21 and a tight seal between the body 10 and the flange 19 is obtained by means of a gasket 22 interposed between said body and said flange. The cover 17 in turn is provided with a radial flange 23 secured to the flange 20 by a suitable number of studs 24 carried by the flange 20. A main diaphragm 25 for controlling the opening and closing of the main valve 1 is marginally clamped between the flange 20 and the flange 23.

The intermediate section 16 is provided with a transverse wall 26 which forms a closure for the lower end of the hollow cylindrical portion 18. The wall 26 is centrally apertured and carries a guide bushing 27 for a valve stem 28. Leakage from the main valve 1 along the stem 28 into the intermediate section 16 is prevented by a suitable stuffing box construction 29.

The valve stem 28 has a reduced, threaded lower end 30 which extends through an opening 31 in a closure member 32. A plain nut 33 and lock nut 34 securely fasten the closure member 32 to the end 30 of the valve stem 28. The closure member 32 is provided with an annular recess 35 which contains a ring 36 of suitable packing material adapted to engage and form a seal with a tapered face portion 37 formed at the inner edge of the valve seat 14.

The valve stem 28 has a second reduced portion 38 which extends through the diaphragm 25, a lower diaphragm supporting plate 39 received in the hollow cylindrical portion 18 of the intermediate member 16, and an upper diaphragm supporting plate 40. In this manner, the plate 40 is disposed in an upper pressure chamber 41 and the plate 39 is disposed in a lower pressure chamber 41a formed in the hollow cylindrical portion 18. The diaphragm supporting plates 39 and 40 are secured to the reduced portion 38 of the valve stem 28 by a plain nut 42 and a lock nut 43. A further reduced extension 44 is provided at the upper extremity of the valve stem 28 and extends through a guide bushing 45 mounted in a boss 46 formed on the cover 17. The boss 46 has a passageway 47 adapted to receive the end portion 44 of the valve stem 28 and said boss is further provided with a passageway 48 which establishes communication between the passageway 47 and the pressure chamber 41. The escape of fluid through the passageway 47 is prevented by a plug 49 threaded into the boss 46. The upward movement of the valve stem 28, and consequently the movement of the closure member 32 away from the valve seat 14, is limited by the engagement of an annular flange 50 on the upper diaphragm supporting member 40 with a complemental annular flange 51 projecting downwardly within the cover 17.

The pilot valve 2 comprises a housing 60 having a fluid distributing base member 61 secured to its lower face by suitable cap screws 62. A gasket 63 is clamped between the housing 60 and the base member 61 to prevent leakage therebetween. The base member 61 has a fitting 64 mounted therein which is connected with a T 65. One side of the T 65 is connected with one end of a tube 66 and the opposite end of said tube is connected to a fitting 67 which communicates with the inlet opening 3a of the main valve 1. The opposite side of the T 65 is connected with one end of a tube 68 and the opposite end of said tube is connected to a fitting 69 which communicates with the outlet opening 7a of the main valve 1. A conventional, flap type check valve 70 is connected in the tube 66 and a similar check valve 71 is connected in the tube 68. Thus, it will be apparent that operating fluid may pass to the fitting 64 of the base 61 in one direction from the inlet opening 3a through the tube 66 and in one direction from the outlet opening 7a through the tube 68 depending upon which opening is under the higher pressure, the check valves 70 and 71 being arranged so that the flow from one tube cannot return to the main valve 1 through the other.

Operating fluid is conducted from the fitting 64 through a passageway 72 in the base 61, an opening 73 in the gasket 63, a passageway 74 in the housing 60, through a strainer 75 and thence through a passageway 76 into a pilot disc chamber 77 in the housing 60. The strainer 75 prevents the entrance of foreign matter into the pilot disc chamber 77 by way of the operating fluid and thus assures trouble-free operation and non-clogging of the pilot valve.

The pilot disc chamber 77 is formed at the lower end of the pilot valve housing 43 and the open end of said chamber is closed by a plate 78 serving as the seat for a pilot valve disc 79. The pilot disc seat 78 may be secured to the pilot valve housing 60 in any convenient manner. As is best shown in Figure 4, the pilot disc seat 78 is provided with a central port 80 and a pair of ports 81 and 82 spaced a predetermined radial distance from the port 80 and arranged upon radii 60° apart. It will be understood that the gasket 63 is provided with openings that register with the ports 80, 81 and 82.

As is shown in Figures 4 and 5, the pilot disc 79 is provided with two through-passageways 83 and 84 adapted to be brought into registration with the ports 81 and 82, respectively, in the pilot disc seat 78. The pilot disc 79 is also provided with a U-shaped exhaust passageway 85, best shown in Figure 5. The exhaust passageway 85 includes an axial leg portion 85a which continuously registers with the central port 80 in the seat 78 and another leg portion 85b which is spaced the same radial distance from the axis of the pilot disc as the through-passageways 83 and 84. It will be seen from Figure 4 that the through-passageways 83 and 84 are located at an angle of about 60° to either side of the exhaust passageway 85 so that it will be apparent that upon turning the pilot disc 79 through an angle of 60°, the through-passage 83 may be moved out of registration with the port 81 of the seat 78 and the exhaust passageway 85 moved out of registration with the port 82 of said seat and into registration with the port 81, simultaneously with the moving of the through-passageway 84 into registration with the port 82. In other words, the exhaust passageway 85 is adapted to alternately register with the ports 81 and 82 in the valve seat 78 and while said exhaust port is registering with one of said ports, one or the other of the through-passageways 83 or 84 is in registration with the other port in said valve seat.

The base member 61 is provided with vertical passageways 80a, 81a, and 82a which continuously register with the ports 80, 81 and 82 in the pilot disc seat 78. The central passageway 80a communicates with a radial passageway 80b in the base 61 and this passageway in turn communicates with a pipe fitting 86 connected with a drain tube 89 discharging either into the atmosphere or a suitable drain. The port 81 communicates with a radial passageway 81b which in turn communicates with a pipe fitting 90 connected with one end of a conduit 91, the other end of which conduit is connected with a fitting 92 communicating with the pressure chamber 41 above the main diaphragm 25. The passageway 82a communicates with a radial passageway 82b which in turn communicates with a fitting 93 connected with one end of a conduit 94, the opposite end of which conduit is connected with a fitting 95 communicating with the pressure chamber 41a at the lower side of the main diaphragm 25. The tube 91 has an adjustable, conventional needle valve 96 connected therein arranged so that it can control the rate of flow of operating fluid to the pressure chamber 41, and thereby definitely control the rate at which the main valve 1 is closed. The control of the closing rate of the valve 1 is important, especially in pipe lines of large size where line shock is a serious problem.

As has been previously indicated, the operation of the pilot valve is controlled in accordance with the pressure differential in the inlet and outlet chambers 3a and 7a of the main valve 1. This is accomplished by incorporating a pressure-responsive pilot diaphragm 100 in the pilot valve housing 60. Thus, as shown in Figure 2, the pilot valve housing 60 is provided with a compartment 101 which is connected by a pipe 102 with the outlet opening 7a of the main valve. A cap 103, which is secured to the housing 60 by screws 104, clamps the diaphragm 100 in place and is provided with a compartment 105 connected by a pipe 106 with the inlet opening 3a of the main valve. Thus, the pilot diaphragm 100 has its opposite sides exposed to the pressure in the inlet and outlet openings 3a and 7a of the main valve 1.

The pilot diaphragm 100 is disposed between diaphragm supporting plates 107 and 108 secured to a reciprocable rod 109 by a nut 110. One end of the rod 109 is slidably supported in a recess 111 in the cover 103 and the opposite end of said rod is supported in a recess 112 in the housing 60. The rod 109 is provided with a series of annular ridges 113, best shown in Figure 3. The ridges 113 mesh with the teeth of a gear 114 mounted upon the upper end of a pilot disc drive shaft 115. The shaft 115 extends through a bore 116 in the pilot housing 60 and is packed against leakage by a stuffing box 117 so that fluid from the pilot disc chamber 79 cannot leak out along the shaft 116 and into the compartment 101, and vice versa. The lower end of the shaft 116 carries a drive washer 118 (Fig. 2) provided with pins 119 adapted to extend into apertures 120 (Fig. 4) in the pilot disc 79 to provide a driving connection between the drive washer 118 and said disc. A spring 121 disposed between the drive washer 118 and the pilot disc 79 urges the pilot disc downwardly to hold said pilot disc against its seat, whereby foreign matter is prevented from getting between said disc and seat should the fluid pressure fail in chamber 77. The upper end of the shaft 116 is received in a plug 122 threaded into the housing 60.

Figure 2 shows the pilot diaphragm 100 flexed toward the right, as when the pressure in the outlet opening 7a of the main valve 1 exceeds the pressure in the inlet opening 3a of said main valve 1 and at which time said main valve should be closed. The flexing of the diaphragm 100 toward the right necessarily will have caused a shifting of the rod 109 to the right with the result that the ridges 113 cause the gear 114 and its associated pilot drive shaft 116 to rotate counter-clockwise through an angle of 60° to take the position shown in Figure 4. Such movement will position the leg 85b of the U-shaped exhaust passageway 85 of the pilot disc 79 in registration with the port 82 of the pilot disc seat 78 and the through-passageway 83 will register with the port 81. Operating fluid under pressure can then pass from the pilot disc chamber 79 through the through-passageway 83 of the pilot disc 79, port 81, passages 81a and 81b in the base member 61, through the fitting 90, conduit 91 and fitting 92 into the upper portion of the pressure chamber 41 to thereby gradually fill said chamber and flex the diaphragm 25 downwardly, forcing the valve stem 28 to move in a similar direction and seat the closure chamber 32 against the valve seat 14 to cut off flow between the inlet and outlet openings 3a and 7a, respectively, of the main valve. The needle valve 96 connected in the conduit 91 will limit the rate at which operating fluid can flow from the pilot disc chamber 79 into the pressure chamber 41 and thereby positively control the rate at which the main valve 1 will close.

Simultaneous with the introduction of operating fluid under pressure into the chamber 41 to effect closing of the main valve, spent operating fluid is exhausted from the pressure chamber 41a at the lower side of the diaphragm 25. Thus, spent operating fluid leaves the pressure chamber 41a through the conduit 94, passageways 82b, 82a in the base member 61, port 82 in the pilot disc seat 78, through the U-shaped exhaust passageway 85 in the pilot disc 79, axial port 80 in the pilot disc seat 78, then through passages 80a and 80b in the base member 61 and finally into the drain tube 89.

It will also be apparent that when the pressure on the inlet side 3 of the valve 1 exceeds the pressure on the outlet side 7 of said valve, as when the pump 6 has been started, the pressure in the inlet opening 3a of the main valve 1 will be communicated to the compartment 105 of the pilot valve housing 60 through the pipe 106 and the pilot diaphragm 100 will be flexed toward the left, as viewed in Fig. 2. Such flexing of the diaphragm 100 causes shifting of the rod 109 toward the left with the consequent rotation of the gear 114, shaft 115 and pilot disc 79 clockwise through an angle of 60° to position the U-shaped exhaust passageway 85 of the pilot disc 79 in registration with the port 81 in the pilot disc seat 78. This same movement will position the through-passageway 84 of the pilot disc 79 in registration with the port 82 in the pilot disc seat 78. As a result, operating fluid under pressure to effect opening of the main valve 1 will then flow from the pilot disc chamber 77 through the through-passageway 84 in the pilot disc 79, port 82 in the pilot disc seat 78, passages 82a and 82b in the base member 61, and then through the conduit 94 to the pressure chamber 41a at the lower side of the diaphragm 25, thereby effecting upward movement of the valve stem 28 with the consequent opening of the main valve 1. Simultaneous with the introduction of operating fluid under pressure into the chamber 41a, spent operating fluid is exhaused from the chamber 41 through the conduit 94, passages 81b and 81a in the base member 61, port 81 in the pilot disc seat 78, through the U-shaped exhaust passageway 85 and the pilot disc 79, and thence through the port 80 in the pilot disc seat 78, passageways 80a and 60ᵇ in the base member 61, and tube 89 to the atmosphere or any suitable drain.

It will also be apparent that the main valve 1 is maintained in either its fully open or fully closed position and that the closure member 32 of the main valve does not flutter between open and closed position while the pressure differential varies or changes from one side of the valve to the other. Thus, the pilot diaphragm 100 must be in its substantially fully flexed position either toward the right or toward the left to align the passageways in the pilot disc 79 with the ports in the pilot disc seat 78. In other words, the main valve 1 will remain fully closed until the pilot diaphragm 100 has been flexed toward the left a distance sufficient to rotate the pilot disc through an angle of about 60°. When the shaft 115 has been rotated to an intermediate position, say through 30°, it will be evident that none of the passageways in the pilot disc 79 lies in registration with the ports 81 and 82 in the pilot disc 78 and, therefore, no fluid is either admitted into or drained from the pressure chambers 41 and 41ᵃ, and hence the main valve 1 will remain closed until the U-shaped exhaust passageway 85 registers with the port 81 in the pilot disc seat 78, whereupon the main valve 1 will open in the manner before described. Similarly, the main valve 1 will remain fully open until the U-shaped exhaust passageway 85 has been shifted to a position in registration with the port 82 to effect full closing of said main valve.

It will be understood from the foregoing, that the main check valve 1 is operated automatically in response to slight pressure variations in the inlet and outlet openings of the main valve, and that the main valve, contrary to the operation of conventional check valves, assumes either a fully open or fully closed position in accordance with the changes in the pressure differential.

Having thus described the invention, what is claimed is:

1. Pilot valve means, comprising: a housing, a fluid distributing base member secured to said housing, said housing having a pilot disc chamber adjacent said base member adapted to receive operating fluid under pressure; a pilot disc seat forming a closure for said pilot disc chamber, a rotatable, ported pilot disc in said pilot disc chamber, said pilot disc seat having an axial opening and said base member having an axial passageway communicating with said axial port and discharging to the atmosphere, said pilot disc having a U-shaped exhaust passageway, one leg of which is in constant communication with the axial port of said pilot disc seat, said pilot disc seat and said base member also having aligned angularly spaced ports and passageways, respectively, said pilot disc having through passageways arranged one upon each side of said U-shaped exhaust passageway and upon an angle relative to said U-shaped passageway corresponding to that of the angular spacing of the ports in said pilot disc seat, the other leg of said U-shaped exhaust passageway being adapted to register with the angularly spaced ports in said pilot disc seat, whereby when said other leg of said U-shaped exhaust passageway is aligned with one of the ports in said pilot disc seat, one of said through-passageways of said pilot disc is aligned with the other port in said pilot disc seat; and means for effecting rotation of said pilot disc.

2. Pilot valve means, comprising a housing and a fluid distributing base member secured to said housing, said housing having a pilot disc chamber adjacent said base member adapted to receive operating fluid under pressure; a pilot disc seat forming a closure for said pilot disc chamber, a rotatable, ported pilot disc in said pilot disc chamber, said pilot disc seat having an axial port and said base member having an axial passageway communicating with said axial port and discharging to the atmosphere, said pilot disc having a U-shaped exhaust passageway, one leg of which is in constant communication with the axial port of said pilot disc seat, said pilot disc seat and said base member also having aligned angularly spaced ports and passageways, said pilot disc having a through-passageway arranged one upon each side of said U-shaped exhaust passageway and upon an angle relative to said U-shaped passageway corresponding to that of the angular spacing of the ports in said pilot disc seat, the other leg of said U-shaped exhaust passageway being adapted to register with the angularly spaced ports in said pilot disc seat, whereby when said other leg of said U-shaped exhaust passageway is aligned with one of the ports in said pilot disc seat, one of said through-passageways of said pilot disc is aligned with the other port in said pilot disc seat; and means for effecting rotation of said pilot disc including a pilot diaphragm mounted upon said housing, said housing having a compartment on each side of said pilot diaphragm, said pilot diaphragm being operable in accordance with the pressure differential in the compartments upon the opposite sides of said pilot diaphragm, a rod connected with said pilot diaphragm arranged to be reciprocated by said pilot diaphragm, said rod having a series of ridges formed thereon, a gear meshing with said ridges, and a shaft operatively interconnecting said gear and said pilot disc to effect rotation thereof as said rod is reciprocated.

DONALD G. GRISWOLD.

REFERENCES CITED

The following references are of record in the file of this patent:

UNITED STATES PATENTS

| Number | Name | Date |
|---|---|---|
| 703,603 | Laux | July 1, 1902 |
| 836,317 | Gerdes | Nov. 20, 1906 |
| 993,628 | Williams | May 30, 1911 |
| 1,410,098 | Hamilton | Mar. 21, 1922 |
| 1,606,245 | Lang | Nov. 9, 1926 |
| 1,619,948 | Mangiameli | Mar. 8, 1927 |
| 1,890,678 | Goldberg | Dec. 13, 1932 |
| 1,958,262 | Boland | May 8, 1934 |
| 2,025,411 | Goldberg | Dec. 24, 1935 |